Aug. 6, 1963 V. L. CRILE 3,099,903
GRINDER FOR SHEAR BLADE
Filed April 4, 1962 4 Sheets-Sheet 1

Vaughn L. Crile
INVENTOR.

BY *Clarence A. O'Brien*
*and Harvey B. Jackson*
Attorneys

Vaughn L. Crile
INVENTOR.

United States Patent Office 3,099,903
Patented Aug. 6, 1963

3,099,903
GRINDER FOR SHEAR BLADE
Vaughn L. Crile, 935 S. Main St., Washington, Pa.
Filed Apr. 4, 1962, Ser. No. 184,966
11 Claims. (Cl. 51—94)

This invention comprises a novel and useful grinder for shear blades and more particularly pertains to a power driven sharpener specifically adapted to provide a precisely shaped cutting edge upon the blades of shears specifically adapted for cutting glass.

In the cutting of glass and particularly of streams of molten glass in the glass working industry there is employed a shear construction utilizing a plate-like blade having a V-shaped notch therein diverging outwardly towards the edge of the blade and wherein the edges of the notch comprise the cutting edges of the blade. When the cutting edges become worn, it is necessary to resharpen the latter to a very precisely regulated contour and bevel. Owing to the angular inclination of the two cutting edges of the blade of this character a problem arises in properly holding the blade and shifting the latter appropriately with respect to a stationarily mounted rotary cutting element in order that the latter may accurately impart the sharpened beveled contour to the cutting edges of the V-shaped notch of such blades. Moreover, in such blades, the angular inclination of the cutting edges varies in different constructions between 80 and 85 degrees. Owing to this variation, a further problem is presented in attempting to provide a mechanism which will automatically reposition a blade so that the cutting edges of different inclinations may be properly positioned to the stationarily positioned power operated grinding element of the sharpener.

It is therefore the primary purpose of this invention to provide a blade holding and positioning means which will effectively operate under the above mentioned conditions and will automatically properly present a blade so that its angularly inclined V-shaped cutting edges may be alternately positioned in a proper manner for operative engagement with a rotary cutting element.

A further object of the invention is to provide a device in accordance with the foregoing objects which will enable the blade holder to be adjustably oscillated through an angular interval so as to alternately position one or the other of the blade cutting edges for operative engagement by the cutting element.

Yet another object of the invention is to provide a construction which is readily applicable to conventional types of power operated grinders for adapting the latter to the specific operations required for the sharpening of shear blades of the above set forth character.

A still further object of the invention is to provide a device in accordance with the preceding objects wherein a single power means employed to effect back and forth movement of a carriage with respect to the stationarily mounted cutting element is also utilized at controllable and properly timed intervals to effect a shifting of the blade holder and the blade carried thereby to selectively and in alternation position the two cutting edges of the blade for operative engagement by the cutting element of the sharpener.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
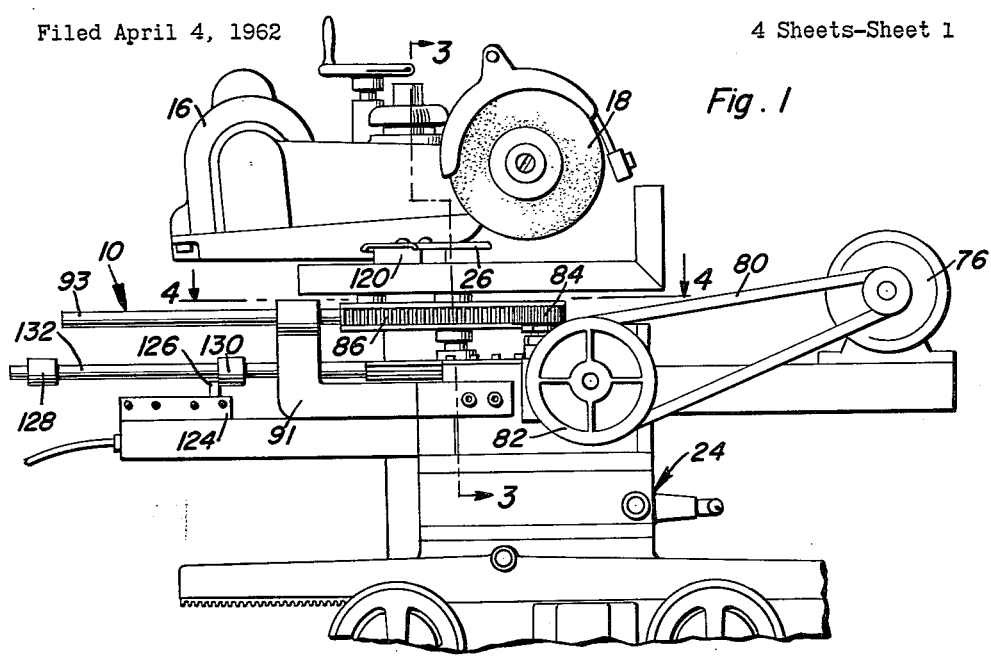
FIGURE 1 is a side elevational view showing that portion of an automatic grinder or sharpening machine to which the principles of this invention have been applied.
Figure 2:
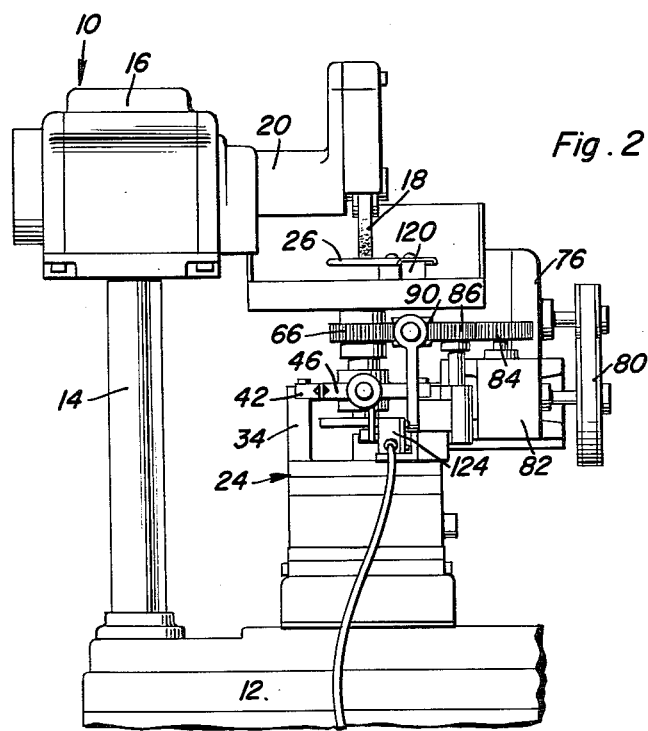
FIGURE 2 is an end elevational view taken from the left end of FIGURE 1.

Referring first specifically to FIGURES 1 and 2, the numeral 10 designates generally any conventional form of power operated grinder to which the blade holding device of this invention has been applied. Shown as an attachment readily applicable to such conventional and well known tool grinders as the Delta and the Brown and Sharpe, the invention may also be readily built into the original structure of the tool grinder. The conventional grinder 10 includes a supporting framework or structure including a usual base portion 12 from which rises a standard 14 carrying at its upper end an electric motor 16 or other suitable source of power by means of which rotation is imparted to a cutting element 18 journaled in a suitable mounting bracket or other support structure 20 carried by the motor 16 or its mount upon the standard 14. The cutting element 18 has been illustrated as consisting of an emery wheel although it will be appreciated that other types of cutting elements may readily be employed which are capable of cutting and sharpening the cutting edges of a metal shear blade.

Figure 3:
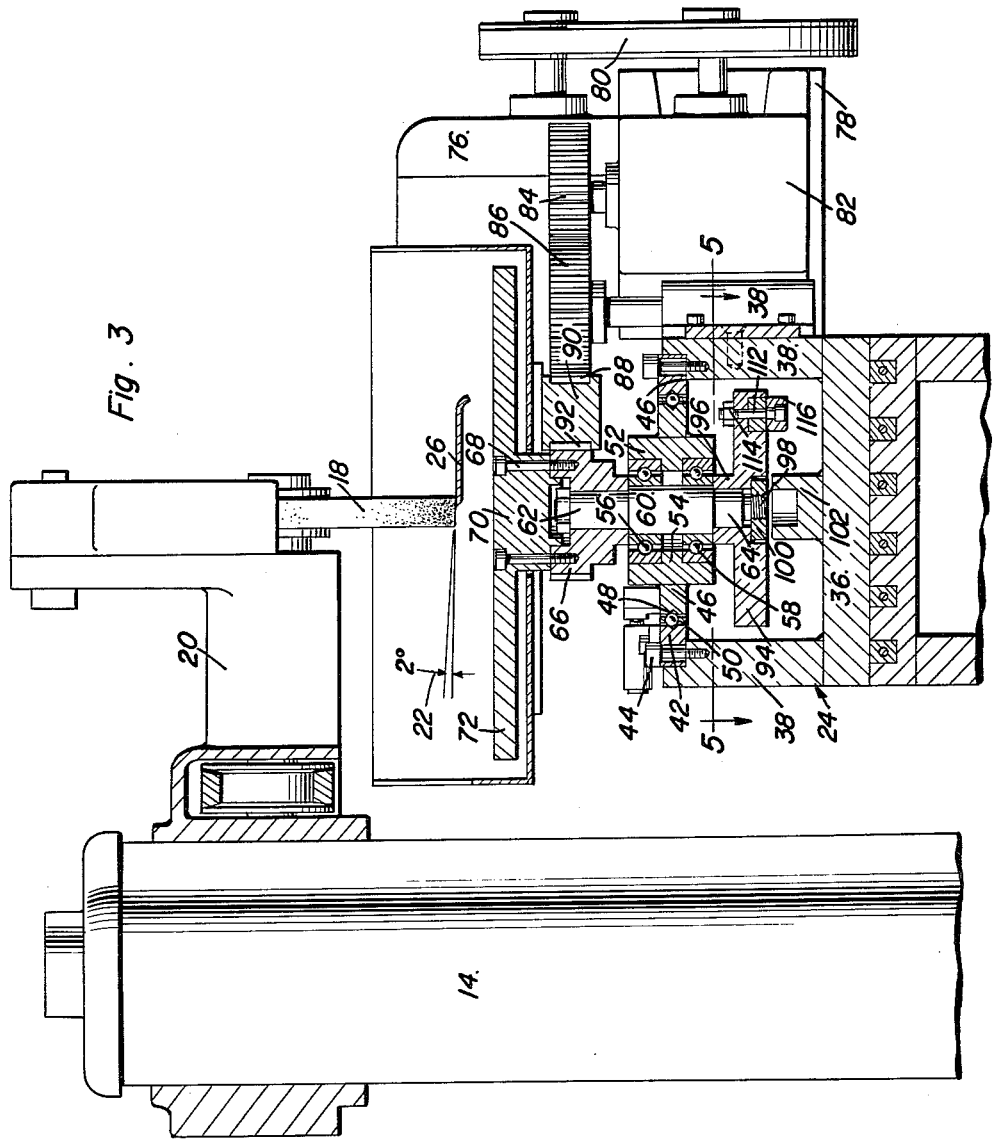
FIGURE 3 is a vertical transverse sectional view taken upon an enlarged scale substantially upon the plane indicated by the section line 3—3 of FIGURE 1 and showing certain of the details of the mounting and operating mechanism of this invention.

In view of the particular and special purpose for which the sharpener of this invention is designed, the rotary cutting element 18 has its peripheral cutting surface inclined to its axis of rotation at a small angle such as that indicated at 22 in FIGURE 3. For the particular type of shear blades to be sharpened by this device, this angle is preferably about 2 degrees although it will be appreciated that for other purposes and uses the angle would be correspondingly varied.

The conventional grinder to which this invention is applied further includes in addition to the supporting base structure 12 a base comprising a magnetic chuck designated generally by the numeral 24 and which is suitably supported upon and rises from the base structure 12 and is disposed beneath but in appropriate proximity to the cutting element 18.

Figure 6:
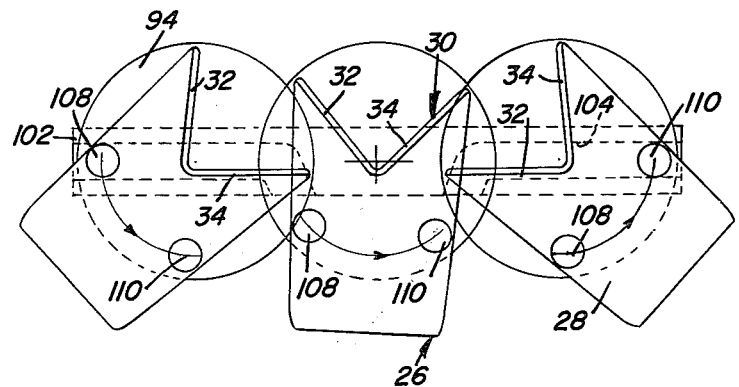
FIGURE 6 is a diagrammatic view showing in top plan the oscillation of the blade holder and the blade carried thereby during the operation of the device.

It is to this base 24 that the blade supporting and blade positioning mechanism forming the subject matter of the invention set forth and claimed hereinafter is applied. Attention is now directed specifically to FIGURE 6 for an understanding of the particular construction of the shear blade for which the sharpener of this invention is specifically designed.

The shear blade indicated generally by the numeral 26 has been shown in FIGURE 6 in three different positions during its manipulation by this invention. The blade is of a well known type employed in glass shears, consisting of a flat plate-like body 28 having at one edge thereof an inwardly extending V-shaped notch 30 whose sides constitute cutting edges 32 and 34 respectively, these cutting edges being outwardly divergent and inclined to each other in an angular relation ranging between 80 to 85 degrees. The cutting edges are provided by beveled surfaces at about a 2 degree angle to the material of the body 28 of the blade. In conventional glass shears, various angular relationships of the cutting edges 32 and 34 ranging between 80 to 85 degrees are commonly employed. It is therefore necessary that an apparatus for sharpening such blades shall be capable of adjustment in the positioning of the blades with respect to a stationarily mounted cutting element so as to properly position each of these grinding elements in turn to the stationarily mounted, specifically contoured cutting element 18.

Referring now primarily to FIGURE 3 it will be observed that the base 24 includes a bottom wall 36 from which rise side walls 38. The latter are open at their upper end to provide a channel or trough-like structure and their upper edges are recessed as at 40 to receive therein a pair of longitudinally extending horizontally disposed tracks or guide rails 42 retained as by fastening bolts 44. A carriage in the form of a generally rectangular plate 46 is received and slidably supported for guided back and forth movement between these side rails 42. Cooperating longitudinally extending semi-cylindrical channels 48 are provided in the adjacent edges of the rails 42 and the carriage plate 46 to receive anti-friction means 50 therebetween by means of which the carriage is supported by the rails for guided reciprocatory movement in a horizontal plane.

Extending vertically through the carriage is a sleeve or cylindrical member 52 which may be secured in an aperture in the carriage as by welding or the like. The member 52 intermediate its extremities has an internal annular rib 54 providing on its upper and lower surfaces seats receiving conventional ball bearing assemblies 56 and 58 respectively.

Figure 7:
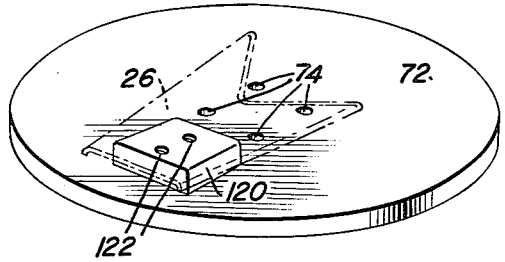
FIGURE 7 is a perspective view of the blade holder showing in phantom the position of a blade mounted thereon in accordance with this invention.

A mounting pin comprising a journaling axle is received in and carried by the member 52, consisting of a cylindrical mid-portion 60 which is journaled in the bearings 56 and 58, together with diametrically reduced cylindrical upper and lower end portions 62 and 64 respectively. Secured to the portion 62 is a spur gear 66 to whose upper end is detachably secured as by fastening bolts 68 the hub 70 of a blade holder 72. As shown in FIGURE 7, the blade holder 72 consists of a circular disc having a series of apertures 74 extending therethrough for receiving the fastening bolts 68.

The gear 66 as set forth hereinafter provides a means whereby sliding movement is imparted to the carriage 46 and oscillatory movement is applied to the holder 72.

Figure 4:
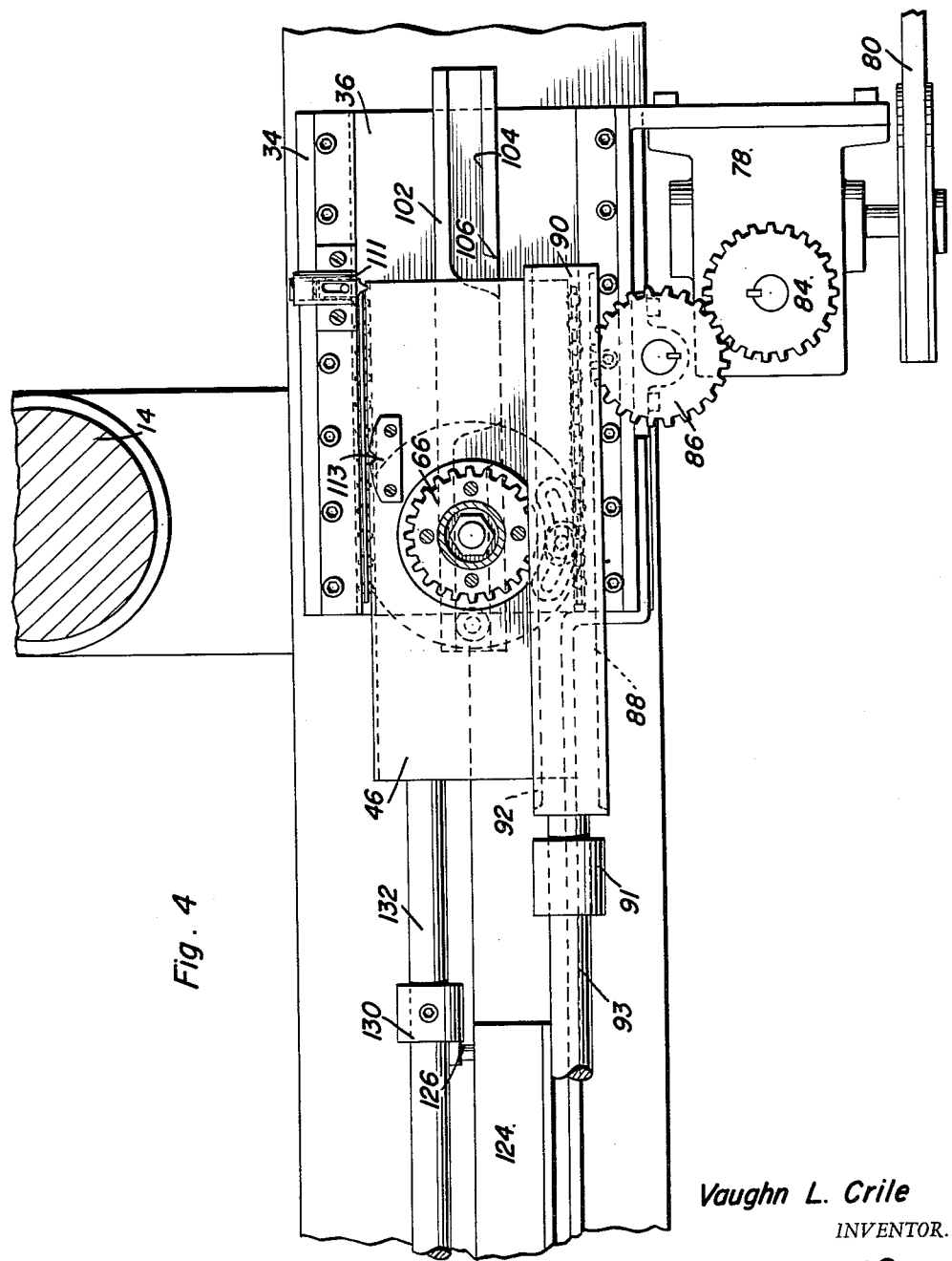
FIGURE 4 is a horizontal sectional detail view taken upon an enlarged scale substantially upon the plane indicated by the section line 4—4 of FIGURE 1 and showing more particularly the arrangement and operation of the slidable carriage upon which the blade holder is mounted in accordance with this invention.

Means are provided for effecting reciprocatory back and forth travel of the carriage 46. For this purpose there is provided a drive means in the form of an electric motor or the like 76 which may be conveniently mounted upon a supporting bracket 78 extending from one of the side walls 38, and which motor through a belt drive 80 and a pulley system and a reduction gear or transmission assembly 82 imparts rotation to a driving gear 84. The latter, as shown in FIGURE 4, is in mesh with a driven gear 86 which latter engages the gear teeth 88 on one side of a reciprocatory rack bar 90, having gear teeth 92 on its other side which are engaged with the spur gear 66. As will be appreciated, any desired supporting and guiding means such as the guide bracket 91 and the rack bar extension 93 slidable therein may be provided for confining the rack bar 90 to rectilinear sliding movement.

The arrangement is such that upon energization of the gear 84, reciprocatory movement back and forth is applied to the rack bar 90 which through its engagement with the gear 66 tends to rotate the latter. Since such rotation is prevented by means to be subsequently set forth except at precisely predetermined timed intervals, the movement of the rack bar in turn imparts reciprocatory travel to the carriage 46.

The diametrically reduced lower end 64 of the journal axle is provided with a control means which times and regulates reverse oscillation of the journal axle and of the holder 72 fixed thereto.

Suitably fixedly secured to the lower end of the journal pin on the reduced lower portion 64 thereof is a circular plate or disc 94. Conviently, this disc includes a central tubular hub 96 secured to the extremity of the threaded diametrically reduced termial portion 98 of the journal pin by means of a recessed fastening nut 100. The plate 94 cooperates with the longitudinally extending member 102 which is welded or otherwise fixedly secured to the bottom wall 36 of the base between the side walls 38 thereof.

Figure 5:
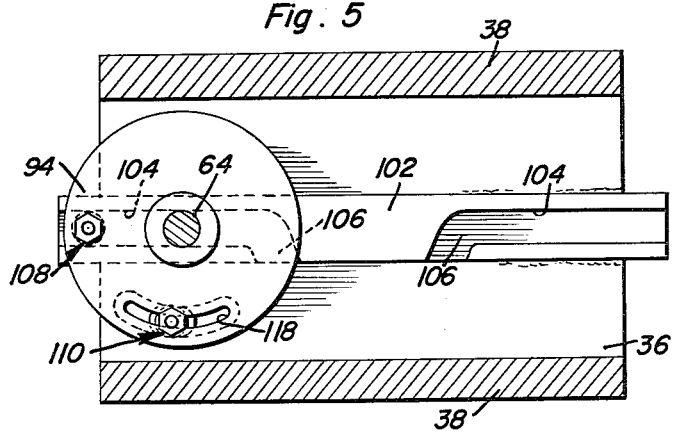
FIGURE 5 is a further view in top plan taken upon a plane which is generally indicated by the section line 5—5 of FIGURE 3, although this view is not a true section upon that section line, and showing in particular the arrangement of the means for effecting controlled and adjusted reverse oscillation of the blade holder in accordance with this invention.

Referring now to FIGURES 5 and 6 in particular it will be noted that the member 102 has a pair of cam tracks formed in the top surface of the end portions thereof. Thus, each cam track consists of an elongated straight portion 104 which at its inward extremity has a laterally divergent entrance portion 106. These cam tracks are preferably of identical configuration but reverse with respect to each other.

Cooperating with the cam tracks are a pair of cam follower elements respectively indicated by the numerals 108 and 110. Inasmuch as these elements are of identical construction, the same reference numeral will designate the corresponding parts thereof. Each cam follower member consists of a bolt 112 extending through an opening in the member 94 and which is retained in place as by a fastening nut 114. The bolt projects below the bottom surface of the member 94 and carries thereon a rotatable roller 116 which is receivable and movable in the cam tracks.

As will be best apparent from a consideration of FIGURE 5, the two cam follower units 108 and 110 are spaced from each other circumferentially of the periphery of the member 94, and one of these followers as for example the cam follower 110, has its bolt extending through a circumferentially or arcuately elongated adjusting slot 118 provided in the plate. By virtue of this arrangement, the angular spacing between the two cam followers can be readily adjusted for a purpose to be subsequently apparent.

The arrangement is such that one of the follower units such as the unit 108 is capable of traveling in one of the cam tracks at one end of the member 102, with the other follower unit 110 being idle; while the follower 110 in turn is capable of traveling in the other of the cam tracks at the other end of the member 102 while the first cam follower 108 is idle. For this purpose, a rotational movement of the followers and of the member 94 and thus of the entire holder supporting and journaling assembly is necessary which movement is relied upon to impart the desired rotational displacement of the blade 26 to properly position it for action thereon by the cutting element 18.

By way of example, it will be understood that the angular relationship of the two cam follower units 108 and 110 to each other corresponds to the angular relationship of the two cutting edges 32 and 34 to each other. Thus, where the relationship between the edges 32 and 34 varies from 80 to 85 degrees, the angular relationship of the cam followers will vary correspondingly from 100 to 95 degrees so that the combined angular relationships will total 180 degrees. Accordingly, the relative angular adjustment of the two cam followers by virtue of the slot 118 enables the setting of these followers at the corresponding angular relationship which is necessary for a given angular relationship of the cutting edges 32 and 34.

The operation of this portion of the invention is as follows.

With one of the cam followers riding in the straight portion 104 of a cam track, rotation of the gears 84 and 86 and reciprocation thereby of the rack 90 will tend to rotate the gear 66 and the holder 72 carried thereby. However, the travel of the cam follower in one of the tracks 104 will prevent such rotation so that the rack thus will impart a straight line movement to the holder 72 and to the carriage 46 upon which the holder is mounted. During this straight line movement, it will be understood that the blade 26 carried by the holder is at the proper angle for one of its cutting edges to be operatively engaged by the cutting element at the precise desired angle so as to sharpen this cutting edge.

After the carriage has completed the requisite travel in one direction, the cam follower engaged in the straight portion 104 of a cam track will emerge from the entrance opening 106. Thereupon further movement of the rack 90 is effective to cause rotation of the gear 66, of the journal bearing and thus of the holder 72 and the blade carried thereby. This operation will be apparent from a consideration of the middle position of the holder 26 of FIGURE 6 as compared to either end position. This rotation will continue until the cam follower has just left the entrance opening 106 of a cam track and the other cam follower such as the unit 110 will now move into position to engage the entrance opening 106 of the other cam track as shown at the right end of FIGURE 6. Thereafter, since the cam holder has changed from the position at the left end of FIGURE 6 to that at the right end of FIGURE 6, the cam follower unit will retain the holder in this adjusted position until the travel through the fixed portion 104 of the second cam track has been completed.

When a cam follower is in either of the straight portions of the track, the corresponding cutting edge 32 or 34 is appropriately positioned for engagement by and sharpening by the cutting element 18. It will thus be apparent that during each back and forth reciprocation of the carriage and of the holder carried thereby, the holder is rotated or oscillated in reverse directions to alternately position one of the cutting edges in proper relation to the cutting element for sharpening of this edge.

Referring now specifically to FIGURE 7 it will be observed that a suitable fastening means is provided upon the holder 72 for securing a blade 26 thereto. Conveniently, this fastening means may include a block 120 fixedly secured to and rising from the plate and which is provided with a pair of apertures 122 by means of which fasteners of any suitable character may secure removably thereto the holder blade as indicated in phantom in FIGURE 7.

In order to render the device automatic in its operation and to effect a reversing reciprocatory travel of the carriage, a reversing mechanism is provided. Conveniently, the driving motor 76 is reversible in operation and is controlled by a conventional form of reversing switch 124 mounted upon a suitable portion of the base 24 or the supporting base structure 12. This reversing switch is operatively connected to the circuit of the motor 76 by suitable conductors, not shown, and is provided with a switch actuating lever 126 which projects therefrom into the path of movement of a pair of adjustable actuating collars 128 and 130, each longitudinally adjustably fixedly secured to a switch actuating rod 132 which is fixedly secured to the carriage 46. The arrangement is such that when the carriage reaches a desired position, the appropriately adjusted stop 128 or 130 will reverse the operation of the motor and thus the reciprocation of the rack bar 90 thereby effecting a reversal of the recprocatory travel of the carriage and the holder carried thereby.

To facilitate and render more certain the passage of the rollers 108 and 110 into and out of the cam tracks 106, there are provided cooperating, resiliently engageable lock elements 111 and 113, see FIGURE 4, which yieldingly restrain the carriage 46 against movement while the rollers are disengaged from the cam tracks. Usually these lock elements will not be necessary for a proper operation of the machine.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A sharpener for shear blades of the type including a cutter blade having in one edge thereof an inwardly extending outwardly divergent V-shaped notch with cutting edges defining the sides of said notch, said sharpener comprising a base having a bed thereon, a carriage, means slidably mounting said carriage on said bed for guided back and forth movement, a power operated rotary cutting element mounted in fixed relation to said bed and in proximity to said carriage during the carriage movement, a holder for supporting a shear blade above said carriage in position for operative engagement by said cutting element, power-operated driving means connected to said carriage for causing said back and forth movement, means journaling said holder upon said carriage for ocsillation about an axis which is perpendicular to the direction of movement of said carriage, means connected to said holder for reversibly oscillating the latter about said axis intermediate each stroke of said back and forth movement of said carriage for alternately positioning said blade cutting edges into position for alternate engagement with said cutting element during said back and forth movement.

2. The combination of claim 1 wherein said means for reversibly oscillating said holder is connected to and driven by said driving means.

3. The combination of claim 1 wherein said holder journaling means comprises an axle journaled in said carriage and to which said holder is fixedly secured, said carriage driving means and said reverse oscillating means being each connected to and imparting movement to said axle.

4. The combination of claim 1, said carriage driving means including a rack bar, means guidingly engaging said rack bar, means for effecting reciprocation of said rack bar, a variable connection between said rack bar and carriage.

5. The combination of claim 1 including control means connected to said driving means and effecting reversal of movement of said carriage at predetermined portions of the travel of the latter.

6. The structure of claim 1 wherein said last named means comprises cam means.

7. A sharpener for shear blades of the type including a cutter blade having in one edge thereof an inwardly extending outwardly divergent V-shaped notch with cutting edges defining the sides of said notch, said sharpener comprising a base having a bed thereon, a carriage, means slidably mounting said carriage on said bed for guided back and forth movement, a power operated rotating cutting element mounted in fixed relation to said bed and in proximity to said carriage during the carriage movement, a holder for supporting a shear blade above said carriage in position for operative engagement by said cutting element, driving means connected to said carriage for causing back and forth movement, means journaling said holder upon said carriage for oscillation about an axis which is perpendicular to the direction of movement of said carriage, means connected to said holder for reversibly oscillating the latter about said axis during said back and forth movement of said carriage for alternately positioning said blade cutting edges into position for alternate engagement with said cutting element during said back and forth movement, said holder journaling means comprising an axle rotatably journaled in said carriage and having upper and lower ends projecting upwardly and downwardly from said carriage, said holder being fixedly secured to said upper end, said reverse oscillating means including a cam track fixed to said base and a cam follower secured to said lower end and slidably engaging said cam track.

8. The combination of claim 7 wherein said cam follower is circumferentially adjustable of said axle.

9. A sharpener for shear blades of the type including a cutter blade having in one edge thereof an inwardly extending outwardly divergent V-shaped notch with cutting edges defining the sides of said notch, said sharpener comprising a base having a bed thereon, a carriage, means slidably mounting said carriage on said bed for guided back and forth movement, a power operated rotary cutting element mounted in fixed relation to said bed and in proximity to said carriage during the carriage movement, a holder for supporting a shear blade above said carriage in position for operative engagement by said cutting element, driving means connected to said carriage for causing said back and forth movement, means journaling said holder upon said carriage for oscillation about an axis which is perpendicular to the direction of movement of said carriage, means connected to said holder for reversibly oscillating the latter about said axis during said back and forth movement of said carriage for alternately positioning said blade cutting edges into position for alternate engagement with said cutting element during said back and forth movement, said holder journaling means comprising an axle rotatably journaled in said carriage and having upper and lower ends projecting upwardly and downwardly from said carriage, said holder being fixedly secured to said upper end, said reverse oscillating means including a cam track fixed to said base and a cam follower secured to said lower end and slidably engaging said cam track, said carriage driving means including a rack bar, means guidingly engaging said rack bar, means for effecting reciprocation of said rack bar, a variable connection between said rack bar and carriage.

10. The combination of claim 9 wherein said variable connection comprises a gear fixedly connected to said axle and engaging said rack bar, said cam follower effecting oscillation of the latter in predetermined portions of the back and forth travel of said blade.

11. The combination of claim 10 wherein said cam follower is circumferentially adjustable of said axle.

References Cited in the file of this patent

UNITED STATES PATENTS

| | | |
|---|---|---|
| 2,257,354 | Strezoff | Sept. 30, 1941 |
| 2,600,591 | Wang | June 17, 1952 |
| 2,642,704 | Carter et al. | June 23, 1953 |